United States Patent [19]
Clack et al.

[11] Patent Number: 5,128,035
[45] Date of Patent: * Jul. 7, 1992

[54] FLUID FLOW CONTROL DEVICE FOR WATER TREATMENT SYSTEMS

[75] Inventors: Robert A. Clack, Madison; Richard E. Clack, Windsor; Melvin R. Hemp, Lodi, all of Wis.

[73] Assignee: Clack Corporation, Windsor, Wis.

[ * ] Notice: The portion of the term of this patent subsequent to Mar. 26, 2008 has been disclaimed.

[21] Appl. No.: 653,040

[22] Filed: Feb. 8, 1991

Related U.S. Application Data

[63] Continuation-in-part of Ser. No. 494,155, Mar. 15, 1990, Pat. No. 5,002,664.

[51] Int. Cl.⁵ .............................................. B01D 61/08
[52] U.S. Cl. .................................... 210/251; 210/432
[58] Field of Search .................... 210/652, 195.2, 251, 210/257.2, 321.6, 321.72, 418–424, 428–432

[56] References Cited
U.S. PATENT DOCUMENTS
4,599,171 7/1986 Padilla et al. .................... 210/257.2

*Primary Examiner*—Frank Sever
*Attorney, Agent, or Firm*—Lockwood, Alex, FitzGibbon & Cummings

[57] ABSTRACT

New and improved filtration purification or water treatment systems for providing improved purified drinking water at a point of use are provided in a substantially leak-free fluid flow control device to which the other filtration purification system elements may be matedly engaged. Other system elements may include various filters or filter modules, as well as, system leads for conveying incoming tap water in, outgoing waste water out to drain and purified water from the filter section to a storage tank until desired for use. The fluid flow control device is preferably a unitary thermoplastic body having a number of discrete fluid flow passages extending therein. In a preferred embodiment, the fluid flow control device includes integrally formed input/output connector features, filter-receiving socket portions and an automatic shut off valve disposed in fluid flow communication with certain ones of the passages.

16 Claims, 6 Drawing Sheets

FLUID FLOW CONTROL DEVICE FOR WATER TREATMENT SYSTEMS

CROSS-REFERENCE TO RELATED APPLICATION

This application is a continuation-in-part of prior application Ser. No. 494,155, filed Mar. 15, 1990 now U.S. Pat. No. 5,002,664.

BACKGROUND OF THE INVENTION

The present invention generally relates to reverse osmosis filtration purification systems including a plurality of filter cartridges connected together in series for selectively and sequentially removing specific kinds of impurities from a tap water supply, for disinfecting incoming water and/or for adding nutrients or other additives to the tap water supply. More particularly, it relates to a fluid flow control apparatus which mountingly receives each of the filter or additive cartridges to be used, directs fluid flow internally between the filters within the filter section and connects the filter section to other elements of the overall R.O. purification system.

Reverse osmosis (hereinafter, "R.O.") filtration purification systems are increasingly being employed to purify municipal and well water supplies to provide improved drinking water for the home, for use in ice makers, vending machines, humidifiers, for watering indoor plants and the like. Many applications require that more than one filter be employed in series to selectively remove different impurities. Another reason a series of filters may be needed is that some R.O. membrane filters and other specialty filters require pre-removal of chlorine and/or sediment in order to operate efficiently and properly. In this situation, chlorine may be first removed from the feed water by passing it through an upstream pre-filter before it is fed into the chlorine-sensitive filter positioned downstream.

Various filter cartridges have been developed for use in commercial and residential point of use water purifier systems. Examples include sediment filters, granular activated carbon (GAC) filters; reverse osmosis (R.O.) membrane filters including thin film composite, cellulose acetate, cellulose triacetate and hollow-fiber types; specialty filters for removing lead, iron, phosphates, sulfates, nitrates, as well as, bacteria-removal filters such as ceramic filters, microfilters and ultrafilters. Filter cartridges containing both mechanical and/or chemical removal media generally have a standardized cylindrical configuration including entry and outlet structures for attaching the filters to other system elements. Filter cartridges for adding desired nutrients such as vitamins, calcium, fluoride or the like are also known.

The filter cartridges are placed in standardized pressure vessels and incoming feed water passes into the vessel and through the filter under pressure. Flow through the filter module including the filter cartridge and pressure vessel may vary depending on the type of filter cartridge employed. Some filters work by directing incoming fluid along the periphery of the filter and vessel. Water is forced radially inwardly through the removal media to enter a centrally disposed tube or passage defined in the filter. Product water within the central tube may flow concurrently or counter currently with respect to the feed water flow entering the vessel. R.O. filters typically have three ports to the module including an impure water inlet, a product water outlet and a concentrate or waste water outlet.

Different combinations of these filters in series will require different specific fluid flow connections between the filters, due to variations in flow requirements for each filter in the series. Conventionally, the various flow connections within the filter section from one filter to another and between the filter section and the remainder of the R.O. system are made using plastic or flexible thermoplastic tubing provided with coupling adapters. A major disadvantage associated with these tubing linked networks is leakage. The systems operate under pressure and each and every coupling provides a potential site for leakage.

Another disadvantage of these systems is that changeover of filters within the system is burdensome. Some tubing connections must be detached before a pressure vessel can be removed from the filter series and the filter cartridge replaced. Every time the tubing sections are disconnected and reconnected, the risk of leakage in the system increases. Moreover, some systems present such a complicated network of criss-crossing tubes, that a skilled technician is needed to make repair calls. Lastly, tubing connection systems are undesirably expensive.

In order to overcome the disadvantages of the prior art systems, it is an object of the present invention to provide a filter section fluid flow control apparatus which significantly reduces or eliminates the need for tubing connections between filter modules.

It is another object of the invention to provide a self-contained filter section having a simple connectorized input/output connection to other system elements.

It is a further object of this invention to provide a substantially tubeless fluid flow control device for a filter section including quick disconnect features for the filter modules to facilitate changeover, maintenance and repair.

It is still another object of the present invention to provide a new and improved filter section for use in R.O. systems having a pop-in pop-out feature enabling the entire filter section to be disconnected and removed as a unit from the remainder of the system for repair or substitution by a new filter section unit which may contain the same or different filter cartridges.

SUMMARY OF THE INVENTION

In accordance with these and other objects, the present invention provides a new and improved fluid flow control device for use in a filtration purification apparatus and system to provide improved water quality. The fluid flow control device serves as a substrate for treating the entire filter section as a module or unit. The fluid flow control device includes socketing features for receiving and mounting standard filter modules and other non-standard but commercially available water treatment modules and provides a single connectorized input/output connection to the remainder of the purification system components.

More particularly, in accordance with the invention, the new and improved fluid flow control device comprises a unitary thermoplastic body portion, preferably having a generally rectangular configuration including spaced apart, opposed upper and lower major surfaces. An input/output (I/O) connector is defined at one end of the body portion for connecting the fluid flow control device to a matable I/O connector which is attached to an impure water inlet, a purified water outlet and a waste water outlet associated with the overall system. A plurality of socket formations project outwardly at spaced apart locations from the lower major surface of the body. Each socket formation preferably includes inner and outer tubular projections which define inner and outer recesses. Each recess is provided with a fluid flow aperture defined in the lower major surface of the body portion. Preferably, external threads are provided on the outer surfaces of the outer tubular projection in each socket formation to provide for threaded engagement of a pressure vessel and its associated filter cartridge to the fluid flow control device. A check valve to prevent pure water back flow from the storage tank back to the system may advantageously be of a type configured to be received in the inner recess of the R.O. receiving socket formation.

The fluid flow control device further includes a plurality of fluid flow control passages defined therein for connecting various ones of the socket apertures to specific other socket apertures for directing water flow to and from each filter element, as well as, fluid flow control channels for connecting one or more flow control passages to the integral I/O connector portion. A drain restrictor may be installed in the I/O connector port or along a waste line before drain.

The new and improved fluid flow control device of the present invention may be prepared by hot plate fusion bonding of a pair of individually molded housing halves. The resulting fusion bonded body is a unitary, one piece body whose defined inner fluid flow control passages and channels may be capable of withstanding elevated pressures of up to above about 1100 psi. The fluid flow control passages are defined in the mating faces of each housing half and are bounded by moat regions which provide enhanced fusion bonding of the passage-forming regions and ensures that crossover contamination does not occur.

The fluid flow control passages are specifically designed to include various dams or flow gates for defining a particular flow path through the device which may easily be added or removed from the molds for making the housing halves. This provides a distinct manufacturing advantage in that, by selective removal of mold inserts generally in the form of mold plugs and pins, the flow pattern through the device may be programmed for any combination of filters used with the device, arranged in any order. As a result, a large number of different flow control bodies can be made from the same mold which dramatically reduces manufacturing costs by eliminating the need for several individual molds. Moreover, this feature provides improved flexibility in terms of production and inventory control.

In a preferred embodiment, the fluid flow control device also includes an integral automatic shut off valve formation adapted to receive valve diaphragm inserts, or not, as the particular filter section requires.

In accordance with the invention, the new and improved modular filter section unit may be detached from the system and a new unit put in its place by an unskilled service person. The removed filter section may be returned to a central location for replacement or reconditioning of the filter cartridges within the unit.

Other objects and advantages of the invention will become apparent from the following Detailed Description of the Invention taken in conjunction with the Drawings, in which:

DETAILED DESCRIPTION OF THE PREFERRED EMBODIMENT

Figure 1:
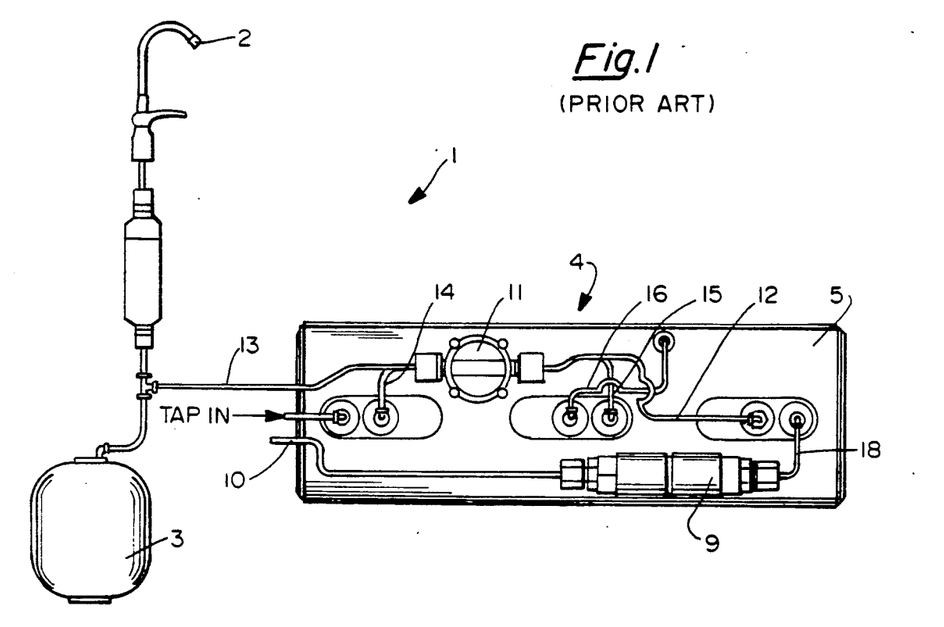
FIG. 1 is a schematic view of a conventional prior art reverse osmosis filtration purification system including an R.O. purified water dispensing faucet, a pressure resistant storage tank and showing a top plan view of a filter section assembly board with tubing connections shown between filter section elements.
Figure 2:
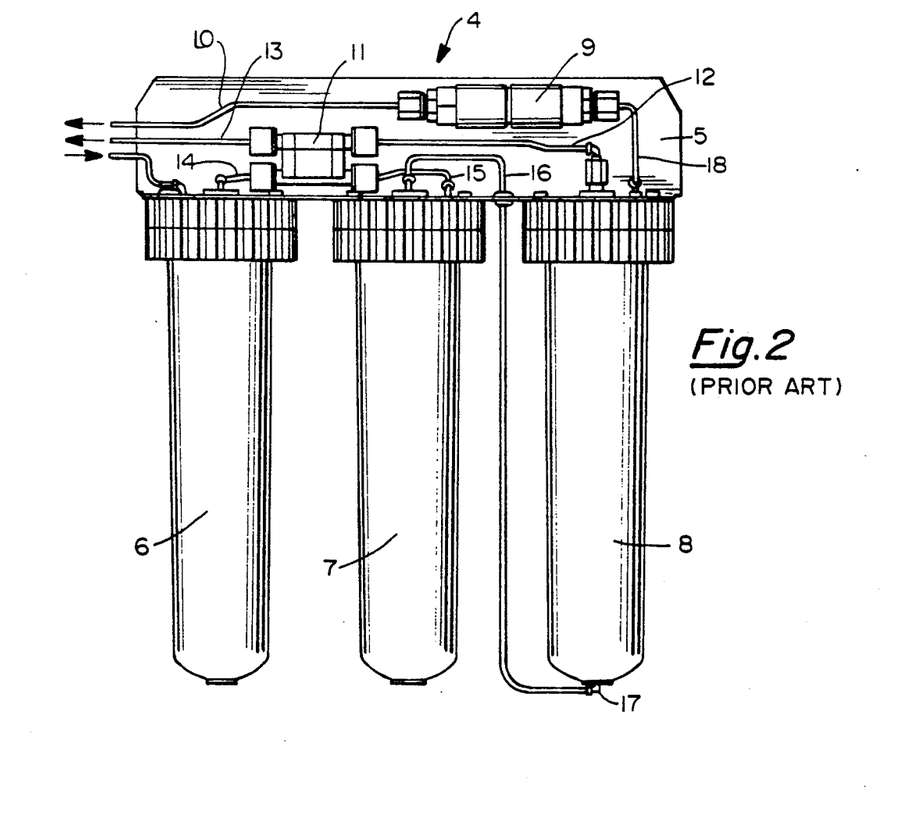
FIG. 2 is a front elevation view of the filter section of the prior art reverse osmosis water purification system shown in FIG. 1.

Referring now to FIGS. 1-2, a conventional prior art system 1 of a filtration purification reverse osmosis type is shown. As shown in FIG. 1, prior art R.O. system 1 includes a dispensing faucet 2 for dispensing purified R.O. water from a storage tank 3 which is provided to temporarily store water made from the reverse osmosis filter section 4 until withdrawn from the faucet 2 as desired. As shown in FIGS. 1 and 2, the filter section 4 of the prior art reverse osmosis filtration purification system 1 includes a generally L-shaped mounting flange 5 to which components and elements of the filter section are mounted.

Referring now to FIG. 2, a series of three different filter modules including a sediment pre-filter 6, an intermediate granular activated carbon (GAC) filter 7 and a right hand reverse osmosis (R.O.) membrane filter 8 are shown extending downwardly from the mounting flange 5. A plurality of tube connections are provided above the filter modules on the mounting flange to connect the various filters together in series and to connect the output from the various filter elements to other system elements. As shown in FIG. 2, the conventional system 1 includes a drain restrictor 9 which is connected to the waste water outlet 10 from a reverse osmosis filter 8 which continues on to drain. An automatic shutoff valve assembly 11 is shown connected to the pure water outlet 12 of the reverse osmosis filter 8 and with a continuing connection to the storage tank 3 shown at the left hand portion of the drawings. The automatic shutoff valve 11 is also connected at its lower portion in between the sediment filter output 14 and the granular activated carbon (GAC) filter input 15.

With respect to the conventional filter section 4 depicted in FIG. 2, incoming tap water at line pressure enters the filter section 4 at the left hand portion as shown in FIG. 2 to enter the sediment pre-filter 6. Pre-filtered water exits the sediment filter module 6 through a central tube 14 and enters the lower left hand portion of the automatic shutoff valve 11. If the shutoff valve 11 is in an open condition, the pre-filtered water exits at the right hand side at the automatic shutoff valve 11 and is directed to the input 15 of the granulated activated carbon (GAC) filter 7. The pre-filtered water is directed downwardly along the length of the pressure vessel containing the granular activated carbon filter 7 and then at the base of module 6 is redirected upwardly through a central filter product tube 16. The sediment pre-filtered and GAC pre-filtered water exits from a central location above the granulated activated carbon filter and is directed by a tubing connection 17 to the base of the reverse osmosis pressure vessel 8. The water enters the bottom of the R.O. vessel 8 and fills the pressure vessel. An upper right hand outlet 10 directs waste water to drain restrictor 9 to drain 10. Pressurized water to be purified migrates through the reverse osmosis membrane and thereafter, radially inwardly to a conduit which spirals toward a central pure water return tube 12 which exits upwardly from a central portion of the reverse osmosis filter module 8 to enter the automatic shutoff valve 11 at the upper right hand connection as shown. Thereafter, the R.O. purified water is directed into the storage tank 3 for temporary storage prior to consumption.

As is clearly shown in FIGS. 1 and 2, the conventional filter section 4 of a prior art multi-filter reverse osmosis system 1 includes a large number of tubing connections between various elements within the system 1 and filter section 4. Each of these connection points provides a potential site for system leakage which is clearly undesirable. Moreover, each of the specific tubing connections are of a given length and changes in the types and patterns of flow for the filters positioned within the filter module arrangement generally cannot be made without preparing a brand new mounting bracket with new dedicated tubing connections between the differing filter elements.

Figure 3:
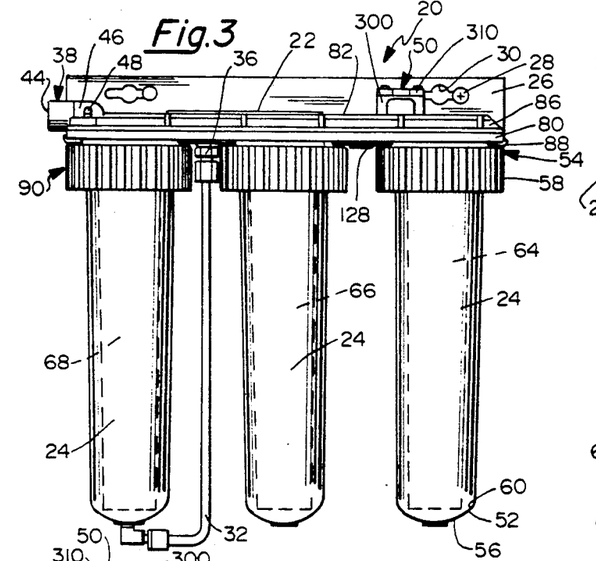
FIG. 3 is a front elevation view of the new and improved filter section of the present invention illustrating one embodiment of the new and improved fluid flow control device with three filter modules attached thereto.
Figure 4:
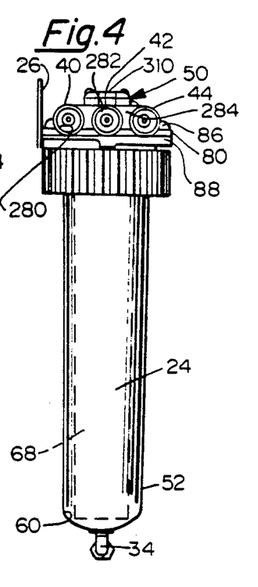
FIG. 4 is a left hand end elevation view of the new and improved filter section in accordance with the present invention taken along lines 4—4 in FIG. 3.

Referring now to FIGS. 3-6, the new and improved modular multi-filter subassembly or filter section 20 of the present invention is illustrated. As shown in FIG. 3, modular subassembly 20 includes a fluid flow control device 22 to which three separate filter modules 24 are mountedly engaged. A mounting bracket 26 including clamping means (not shown) may be employed for removably mounting subassembly 20 to a door, wall or panel in a well known manner, by means of mounting screws 28 and screw head-engaging mounting slots 30. A double ended tubing connector 32 is shown connecting an elbow fitting 34 and a male coupling adaptor 36 extending from fluid flow control device 22.

Figures 5, 6, 7:
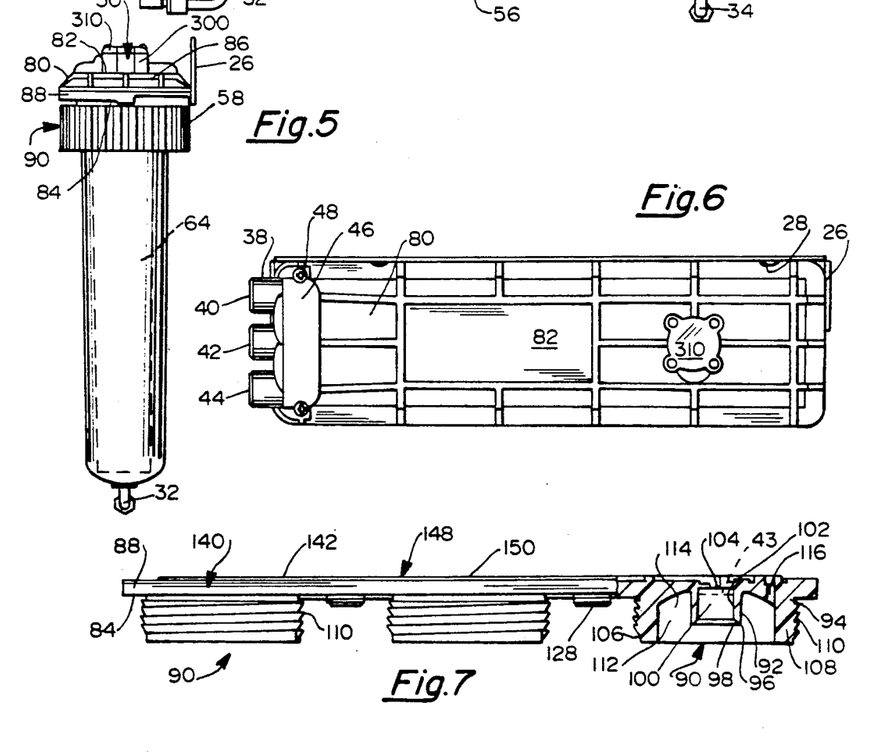
FIG. 5 is a right hand end elevation view of the new and improved filter section taken along view lines 5—5 in FIG. 3.
FIG. 6 is a top plan view of the new and improved fluid flow control device of the present invention.
FIG. 7 is a front elevation view partly in section of the bottom housing half of the new and improved fluid flow control device of the invention.
Figure 22:
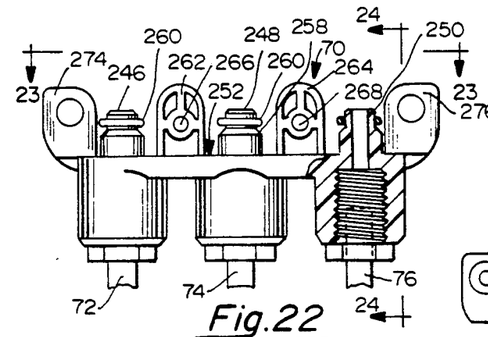
FIG. 22 is a top plan view, partly in section, showing the male connector half of the I/O connector of this invention.
Figure 23:
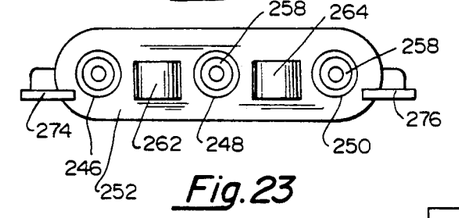
FIG. 23 is a front elevational view of the mating face of the male connector half.
Figure 24:
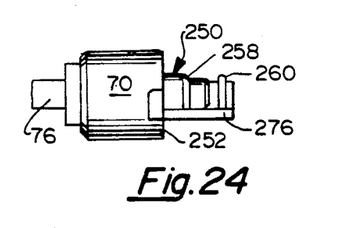
FIG. 24 is an elevated side view of the male connector half, taken along view lines 24—24 in FIG. 22.

Fluid flow control device 22 also includes an input/output connector portion 38 shown to include three mating ports 40, 42 and 44, for connecting device 22 to other elements of an R.O. purification system, such as system 1 shown in FIGS. 1-2. A connector locking member 46, for locking a complimentary mating I/O connector 70 (FIG. 22) in mated and sealed relation with connector portion 38 of device 22 may be removably secured to the device 22 by means of phillips head screws 48 as shown in FIG. 6. An integrally formed automatic shut-off valve assembly 50 (FIGS. 15 and 19-20) projects upwardly from fluid flow control device 22.

Filter modules 24 depending from fluid flow control device 22 are all substantially the same and each includes an outer hollow, generally cylindrical pressure vessel 52 having an open top end portion 54 and an opposing closed bottom or free end 56. The top end portion 54 is provided with an internally threaded, rotatably mounted coupling nut 58 for securely mounting each filter module 24 to fluid flow control device 22 in a manner to be more particularly described hereinafter. Each of the pressure vessels 52 includes a filter receiving cavity 60 for receiving a standardized water treatment element or insert, indicated generally at 62, which includes chemical and/or mechanical removal media for selective removal of suspended and/or dissolved solids from water flowing through filter element 62 and module 24 or may include a mechanical or chemical disinfectant element or a nutrient or water additive element or cartridge.

In the preferred embodiment depicted in FIG. 3, the modular multi-filter subassembly 20 is provided with a sequence of filter modules 24 having a sediment pre-filter insert 64, a granular activated carbon (GAC) filter insert 66 and a thin film cellulose (TFC) reverse osmosis (R.O.) filter insert 68. In accordance with the present invention, substantially all of the fluid flow connections between the various filters and elements in the filter section are made internally within fluid flow control device 22. The filter section arrangement shown in FIG. 3, has a similar filtering sequence and flow path as the prior art system 1 shown in FIGS. 1 and 2.

Accordingly, for this illustrated embodiment, impure tap water at line pressure is introduced into subassembly 20 through mating port 40 in the I/O connector portion 38 of fluid flow control device 22. The incoming tap water is directed by device 22 into pressure vessel 24 containing sediment pre-filter 64 at the opposed end of device 22, wherein suspended solids are removed. The pre-filtered water is directed upwardly into fluid flow control device 22, through the automatic shut off valve assembly 50 and into the second filter module 24 containing the GAC filter 66. Undesired organics, trihalomethanes (THMs) and chlorine, are removed from the flowing stream by the GAC filter 66 and the GAC-filtered water is again directed upwardly into fluid flow control device 22. The GAC filtered water emerges again travelling downwardly through tubing connector 32 to enter elbow fitting 34 in the bottom end 56 of left hand filter module 24 containing the TFC R.O. filter 68. A waste water drain outlet and a central R.O. purified water outlet are provided in device 22 to receive and direct waste water and pure water, respectively, up into different regions fluid flow control device 22. R.O. purified product water leaves the fluid flow control device 22 through input/output connector 38 at mating port 44. A check valve 45 may be provided in the R.O. purified product water outflow line in a socket 90 or in the appropriate mating port 44 in I/O connector 38. Concentrate or waste water exits device 22 through mating port 42 in I/O connector 38. A waste water drain restrictor 43 is preferably provided in mating port 42 of the I/O connector 38.

In accordance with the present invention, means designed to communicate with the remaining elements of the R.O. system are provided to connect the modular multifilter subassembly 20 into the system 1. In accordance with the preferred embodiment, an incoming tap water tubing line 72, an outflowing waste water tubing line 74 to system drain and an outflowing filter-purified product water tubing line 76 to a pure water storage tank, such as tank 3 in FIG. 1, are all co-terminated in a complimentary mating I/O connector 70 shown in FIG. 22 and discussed in detail below.

As a result of its improved features and construction, the modular multifilter subassembly 20 may be placed into operation in an overall filtration purification circuit or system and the possibilities for leakage within the connections of the system are thereby reduced. For example, and by way of illustration, a total of only five poly-tubing connections to and from the device 22 and within the filter section 20 are presented in the preferred embodiment shown in FIGS. 3-5, including two connections at the opposite ends of the double ended tubing connector 32 and three connections for the tubes 72, 74 and 76 terminated in the complimentary I/O connector 70. The prior art system shown in FIGS. 1-2, included sixteen separate tubing connections. By comparison, the new and improved filter section 20 in accordance with this invention significantly reduces the number of tubing connections, thereby reducing the risk of system or section leakage and provides these advantages at reduced cost.

In greater detail and referring again to FIGS. 3-6, the new and improved fluid flow control device 22 of this invention comprises a unitary or one-piece thermoplastic body 80. In the preferred embodiment depicted therein, device body portion 80 has an elongate generally rectangular configuration and includes spaced and opposing upper and lower major surfaces 82 and 84, respectively. In accordance with the preferred embodiment, body 80 is formed from a pair of hot-plate fusion-bonded housing halves, including upper housing half 86 and lower housing half 88. The preferred features for upper housing half 86 are shown in FIGS. 11-16, whereas, the preferred features for lower housing half 88 are depicted in FIGS. 7-10. Although hot plate fusion bonding methods are preferred, other modern plastics bonding methods such as vibration welding, friction welding and sonic welding may also be used.

Referring now to FIGS. 7-10, lower housing half 88 is seen to include three spaced-apart filter-module receiving sockets 90 projecting normally downwardly from the lower surface 84 of housing half 88. The socket formations 90 have generally the same configuration and as shown in FIG. 7, each socket 90 is defined by coaxially-aligned radially inner and radially outer spaced apart tubular or cylindrical projections 92 and 94, respectively. Inner tubular projection 92 extends from lower surface 84 to a free end 96 provided with an inwardly flared or tapered lead-in section 98. Inner tubular projection 92 defines an inner recess 100 having a generally cylindrical configuration which is adapted to telescopically receive and, preferably sealingly engage, a top centralized mating port provided on a standard filter module insert 62. In accordance with standard filter design, the mating port of a filter insert is defined by a projecting cylindrical member which is provided with a peripheral or circumferential groove adjacent the free end which receives an O-ring seal. The O-ring on the side of the cylindrical central mating port of the filter insert is compressed as the filter is engaged in the inner recess 100 in socket 90 so that the O-ring forms a fluid tight seal between the groove on the mating port and the inner cylindrical sidewall surface 102 defining recess 100 on projection 92. A fluid flow aperture 104 is defined in lower surface 84 within inner recess 100. A disk-shaped in-line check valve may be inserted into an inner recess 100 intermediate the mating port of the filter insert and the fluid flow aperture, as desired, to prevent back flow from a storage tank into an R.O. cartridge and vessel, for example.

Socket portions 90 also include a second coaxial and radially outer tubular projection 94, extending from lower surface 84 to a free end 106. A wide bearing surface 108 is defined at free end 106. The outer surface of tubular projection 94 includes an array of external threads 110 adapted to threadingly engage the internal threads provided on coupling nuts 58 carried on pressure vessels 52. The upper open top ends 54 of pressure vessels 52 typically include a wide end lip surface (not shown) provided with a groove and O-ring seal which sealingly engages and abuts against bearing surface 108 on outer projection 94. Accordingly, a liquid tight and pressure tight seal is formed when the coupling nut 58 is rotated to move the vessel a locked position so that the O-ring is compressed to fully engage the pressure vessels 52 and filter elements 62 in the sockets 90. Socket 90 additionally includes an outer annular recess 112 defined between inner projection 92 and outer projection 94. An inner surface portion 114 extending between inner projection 92 and outer projection 94 may be provided in socket 90. A second fluid flow aperture 116 is provided in the outer annular recess 112.

Figure 8:
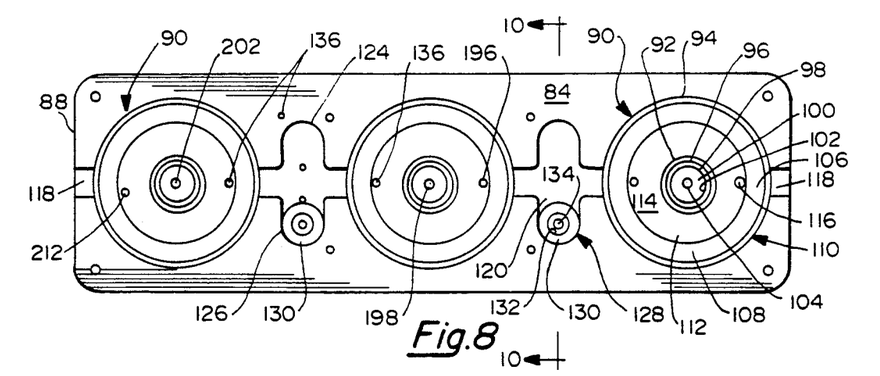
FIG. 8 is a bottom plan view of the bottom housing half of the new and improved fluid flow control device of this invention.
Figure 10:
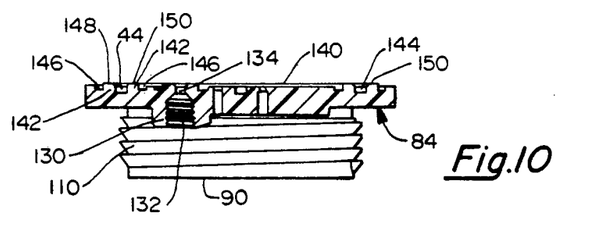
FIG. 10 is an elevated cross sectional view of the bottom housing half taken along view lines 10—10 in FIG. 8.
Figure 11:
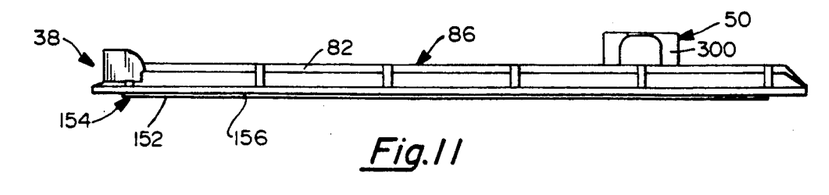
FIG. 11 is a front elevation view of the top housing half of the new and improved fluid flow control device of the present invention.

Referring to FIGS. 7, 8 and 10, lower housing half 88 is preferably molded in a modularized mold incorporating a number of quick change tooling elements such as mold plugs and mold pins, so that the basic mold may be quickly and easily modified to produce any one of a number of predetermined bottom housing half configurations. More particularly, as shown in the bottom view in FIG. 8, lower housing half 88, has a generally symmetrical configuration. A central elongate mold groove 118 is shown extending the length of bottom half 88 which intersects each of the socket portions 90. Branching mold groove formations 120-126 are shown projecting laterally from central groove 118 on either side of the middle socket 90. In mold groove branches 120 and 126, a moldable port site 128 is defined at formations 130.

As shown in FIG. 10, formation 130 in branch 120 has been cored out in the mold to define a port site 128 in lower housing half 88 including a threaded receptacle portion 132 and a fluid flow communication opening or aperture 134. Port site 128 may be provided in any one or more of the branch lobe locations 120-126 as desired for a particular filter section combination. The threaded receptacle portion 132 is adapted to matedly engage or receive a threaded poly tube coupling adaptor 36, known to those skilled in this art and indicated in FIG. 3. Symmetrically positioned circular mold indentations 136 shown in each annular recess area 112 of each socket 90 opposite their respective apertures 116 also indicate that the apertures 116 may be located on either side of the socket 90 as needed by simply moving the quick change tooling in the modular mold.

Figure 9:
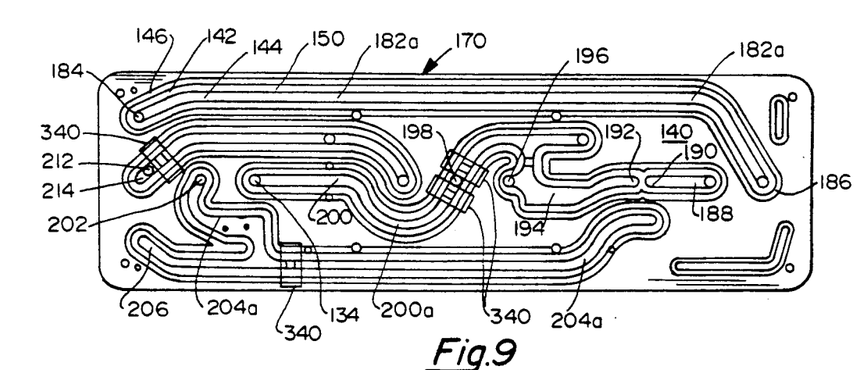
FIG. 9 is a top plan view of the bottom housing half of the new and improved fluid flow control device of the present invention.

Turning now to FIGS. 7, 9 and 10, lower housing half 88 has an upper mating contact surface 140 disposed opposite lower surface 84. Upper contact surface 140 on lower housing half 88 has an uneven surface configuration. As is best indicated in FIGS. 7 and 10, upper contact surface 140 is characterized by raised upwardly projecting wall portions 142, which define fluid grooves 144 therebetween. Moreover, adjacent each upwardly projecting wall 142 extending on outer sides thereof, opposite the fluid grooves 144, are recessed moat or trough areas 146. The free upper ends 148 of each wall portion 142 define raised fusion bonding surfaces 150 adapted to mate and fuse with complimentary bonding surface structures 152 provided in a lower contact surface 154 of upper housing half 86. As is best shown by rectangular zones in FIG. 9, a number of flow gates or dam partitions 340 may be imparted or removed from fluid grooves 144 to alter the fluid flow paths defined by each groove 144 also by means of quick change tooling designed into the convertible modular housing molds.

Referring now to FIGS. 11-15, the structured details of upper molded housing half 86 are shown. Upper housing half is similar in many important respects to its complimentary lower housing half 88 in that it includes the upper surface 82 and an opposing lower contact surface 154. Lower contact surface 154 is also characterized by raised projecting walls 156 whose upper surfaces define bonding surfaces 152 for the upper half 86. Wall projections 156 also define inner fluid flow grooves 158 between adjacent walls 156. Moat or recess areas 160 are likewise provided adjacent the outside edges of wall projections 156. Flow gate or dam areas 340 are also indicated in upper housing 86 at complimentary locations to those shown in lower part 88. In the preferred embodiment depicted in the drawings, top housing half 86 is additionally molded to include an integrally molded automatic shut off valve housing 300 for receiving the automatic shut off valve assembly 50. Top housing half 86 is also molded to include an integrally molded input/output connector portion 38. The automatic shut off valve assembly 50 and I/O connector portion 38 will be described in particular detail hereinafter.

In accordance with the preferred embodiment of the present invention, fluid flow control device 22 is preferably made by hot plate fusion bonding the upper and lower housing halves 86 and 88 together to define a unitary body 80 with fluid flow-control passages extending within said thermoplastic body 80 for directing the flow of fluids in a leak-free manner from one filter module 24 to the next in subassembly 20. Hot plate fusion bonding methods for joining thermoplastic parts are generally known. Hot plate melt fusion methods of bonding basically involve contacting edge surfaces 152 and 150 to be joined with a heated plate to plasticize the thermoplastic edge surfaces. A molten plastic bead is formed by applying pressure so as to push the molded parts against the heated plate. The depth of the molten material or bead can be determined by the design of the grip tooling which holds the parts during melting and fusion bonding, as well as, by employing a pressure regulating system. After contacting the parts or the surfaces of the parts to be joined against the heated plate for a time and at a pressure designed to impart a desired amount of bead, the parts are rapidly separated from the plate surfaces and the plate is withdrawn. Thereafter, the holding fixtures for housing halves 86 and 88 are moved together to contact the molten plastic surfaces 150 and 152 under applied pressure. The molten beads at 150 and 152 of a properly selected thermoplastic material flow together and fuse as the plastic cools forming a unitary thermoplastic body 80.

The hot plate fusion bonding method provides parts which after fusion bonding can withstand very high internal pressures within the fluid flow passageways formed by grooves 144 and 158 defined therein of up to 1100 psi. Air gaps and flashes and incomplete bonding are eliminated by controlling the depth of molten plastic bead that is formed and by providing flash tracks or moat areas 146 and 160 adjacent the upstanding walls 142 and 156. In accordance with the present invention, each of the housing halves 86, 88 for forming the fluid flow control device 22 is preferably molded of a thermoplastic material and, especially preferably each is molded from an alloyed thermoplastic composition comprising ABS and nylon.

The temperatures to which the heat plate must be heated to provide hot plate fusion bonding may vary depending on the thermoplastic material selected. Generally, temperatures on the order of 375° to 520° F. are suitable.

Figure 13:
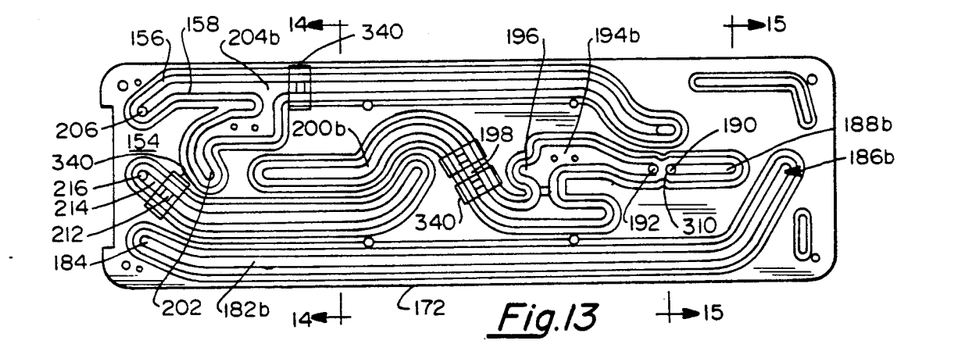
FIG. 13 is a bottom plan view of the upper housing half of the fluid flow control device.
Figure 14:
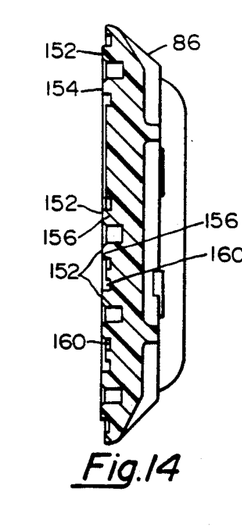
FIG. 14 is an elevated cross sectional view of the upper housing half taken along view lines 14—14 in FIG. 13.

Referring now to FIGS. 3, 9 and 13, the new and improved fluid flow control device 22 is prepared by aligning housing halves 86 and 88 together so that their respective mating contact surfaces 154 and 140 are brought into opposing face to face contact and so that side edge 170 on lower half 88 is aligned with side edge 172 on upper half 86. When disposed in this relationship, the wall projections 142 and 156 are disposed in registration with each other and fuse to form fluid flow passages having a generally rectangular cross-sectional configuration by uniting the U-shaped, semi-rectangular fluid flow grooves 144 and 158. These discrete fluid flow passages direct all fluid flow within device 22 between the filter modules 24.

Figure 15:
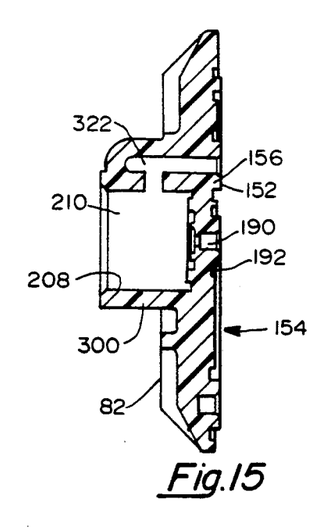
FIG. 15 is an elevated cross sectional view of the upper housing half taken along view lines 15—15 in FIG. 13.
Figure 19:
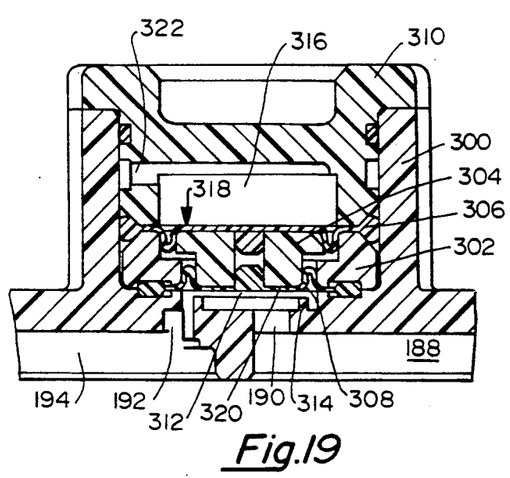
FIG. 19 is an elevated cross sectional view of the automatic shutoff valve for use with the fluid flow control device of this invention.
Figure 20:
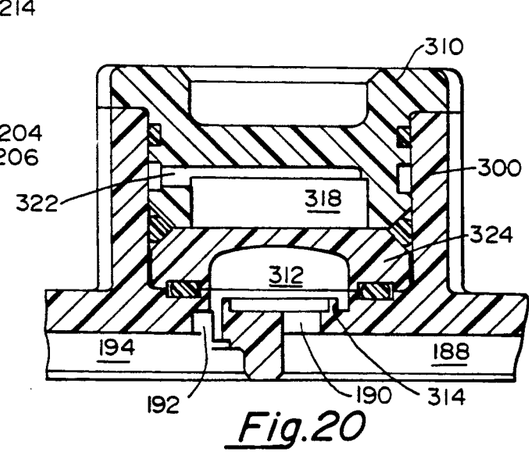
FIG. 20 is an elevated cross sectional view of the automatic shutoff housing which has been converted so that no automatic shutoff function is provided.

More particularly and referring now to FIGS. 9 and 13 in the preferred subassembly 20 shown in FIG. 3, impure tap water enters fluid flow device 22 from tubing 72 attached to complimentary male I/O connector 70. Tap water enters into integral female I/O connector section 38 through port 40. A fluid flow channel 180 extends downwardly in upper half 86 between port 40 and a fluid flow passage 182 defined by complimentary grooves 182a and 182b (FIG. 9). Tap water enters passage 182 adjacent channel orifice 184 and flows along passage 182 substantially the entire length of the device body 80 until it reaches a downflow orifice 186 in lower half 88 (FIG. 9) which communicates with annular recess aperture 116 in the right hand socket 90. Impure tap water fills filter module 24 including sediment prefilter insert 64 and is forced under line pressure to flow radially inwardly through filter 64 to an axial discharge tube sealingly engaged in inner recess 100. The sediment filtered tap water flows upwardly from filter 64 through fluid flow aperture 104 into a passage 188 in device 22 defined by grooves 188a and 188b. An upflow orifice 190 feeds the sediment pre-filtered tap water up through automatic shutoff valve assembly 50 (FIGS. 15 and 19-20). If the valve assembly 50 is in an open condition, the pre-filtered tap water flows downwardly out of valve assembly 50 and through orifice 192 into passage 194.

Passage 194 extends between the valve 50 and a second, center filter module 24 containing the GAC filter 66. The flowing water enters the GAC filter module 24 through annular recess aperture 196 and after downward flow around the central carbon filter media, the filtered water is directed upwardly through the axial GAC filter 66, through central socket aperture 198 and into passage 200 in device 22 formed by grooves 200a and 200b. In place of the GAC filter an extruded, radial-flow carbon block filter module may also be used.

The sediment pre-filtered and GAC-filtered tap water flows along passage 200 and through port aperture 134 to flow through coupling adapter 36, double ended tubing 32 and elbow fitting 34 into the bottom end 56 of left hand filter module 24 containing a TFC upflow R.O. filter insert 68. R.O. purified and filtered water is forced upwardly through central socket aperture 202 into curving passage 204. The R.O.-purified product water leaves passage 204 through a channel orifice which communicates with pure water channel 206. Pure water channel 206 fluidly connects with pure water outlet port 44 in female I/O connector section 38. Pure water is also directed along passage 204 to another orifice 208 which leads to an upper pressurizable chamber 210 in automatic shutoff valve assembly 50.

Waste water or concentrate from R.O. filter module 68 travels upwardly through the associated socket annular recess aperture 212 into a waste water outflow passage 214 which is in turn disposed in fluid flow communication with waste water channel 216 associated with mating port 42 of the female I/O connector portion 38 as has been mentioned above, a small cylindrical in-line drain restrictor insert 43 may be provided in mating port 42.

Having described the formation of the discrete fluid flow passages and the flow circuit there-through for one set up of the preferred filter section 20, a description of other preferred features of fluid flow control device 22 may now be made. As has been mentioned above, fluid connections between the system generally and the fluid flow control device 22, in accordance with the preferred embodiment, are made in a connectorized manner by means of a two piece input/output connector assembly. The two piece I/O connector includes a male plug connector 70 and a matable female receptacle connector 38. In accordance with the invention, it is preferred that one part of the I/O connector be integrally molded with thermoplastic device body 80. In the preferred embodiment shown in FIGS. 4, 12, 16–18 and 21, the female receptacle I/O connector portion 38 is integrally molded into the upper housing half 86 of device body 80.

Figure 12:
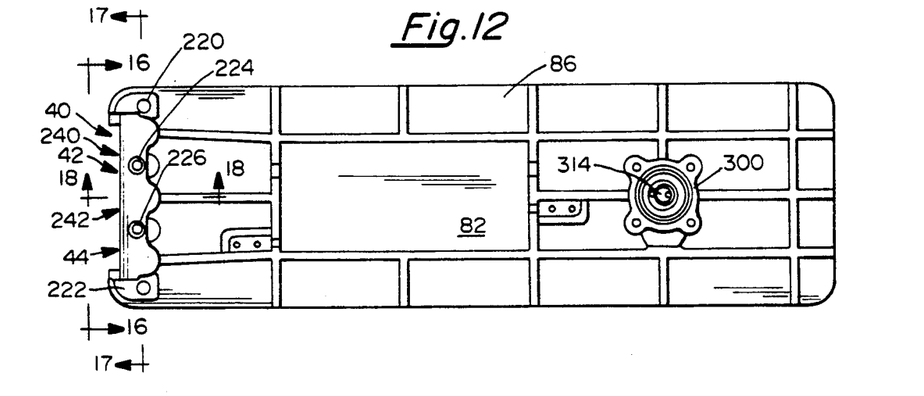
FIG. 12 is a top plan view of the upper housing half of the fluid flow control device.

Referring now to FIG. 12, at the left hand portion of the figure, the female input/output connector housing 38 is shown to include connector locking bracket screw receiving flange members 220, 222, as well as positioning pin receiving apertures 224, 226. The pin-receiving apertures 224 and 226 are adapted to receive positioning pins 228, 230 on the connector locking bracket member 46 (FIG. 26) to keep the male and female input/output connectors 70 and 38 in their fully mated and sealed condition (shown in FIG. 21).

Figure 16:
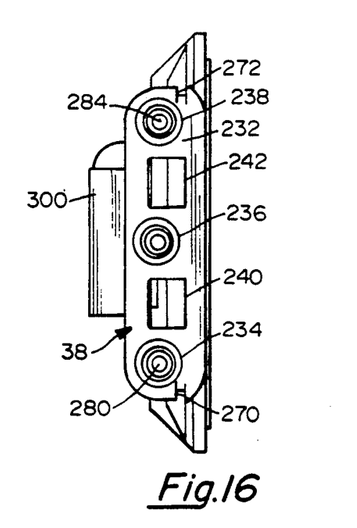
FIG. 16 is a left hand end elevation view of the upper housing half taken along view lines 16—16 in FIG. 12.
Figure 17:
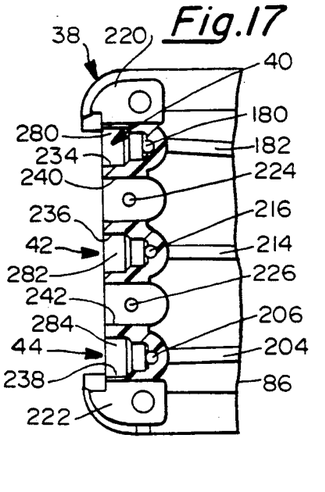
FIG. 17 is a cross sectional view of the female I/O connector in the upper housing half taken along view lines 17—17 in FIG. 12.
Figure 18:
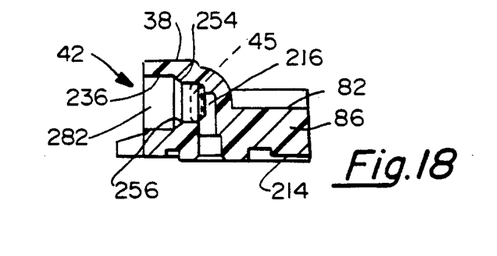
FIG. 18 is a cross sectional view of the female input/output connector on the upper housing half taken along view lines 18—18 in FIG. 12.

Referring now to FIGS. 16, 17, 18 and FIGS. 21-27, further details of connectors 38 and 70 are shown. More particularly, as shown in FIG. 16, the mating face 232 of the female connector half 38 includes three spaced-apart circular openings 234, 236 and 238 and a pair of intermediate rectangular openings 240 and 242. As shown in FIGS. 17 and 18, each of circular openings 234-238 extends rearwardly from mating face 232 to define stepped sockets 280, 282, 284 for receiving fluid conveying projections 246, 248, 250 extending forwardly from the complimentary face 252 of the male plug connector 70. The stepped configuration of each socket 280-284 includes a tapered transition portion 254 best shown in FIGS. 17 and 18, which provides a bearing surface 256 which cooperates with a similarly angled bearing surface 258 on the male projections 246-250 to axially and/or radially compress an O-ring seal 260 (FIG. 21) therebetween to form a fluid tight, sealed connection between each fluid conveying projection 246, 248, 250 defined in the male plug 70 and the respective receptacle sockets 280-284 defined in the female connector 38. As shown in FIGS. 17–18, each of the female receptacle sockets 280-284 includes a fluid flow channel 180, 206 and 216, respectively, connecting the fluid circuits 72, 74, 76 in the male plug member 70 to the aligned passageways 182, 204 and 214 within the fluid control device 22.

Figure 25:
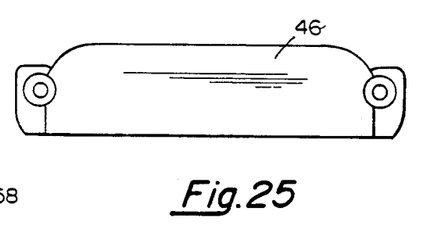
FIG. 25 is a top plan view of the locking bracket for use with the I/O connector of the invention.
Figure 26:
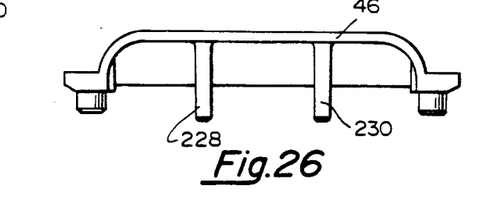
FIG. 26 is a front elevation view of the locking bracket.
Figure 27:
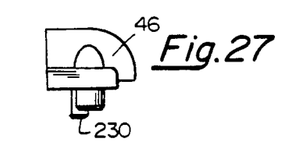
FIG. 27 is a side elevation view of the locking bracket.

Each of the rectangular openings 240, 242 also extends rearwardly from the mating face 232 of the female connector 38 to provide mating alignment guideways for guiding the male alignment projections 262, 264 on the face of plug member 70 into mated engagement within the female connector 38. Also as shown in FIG. 16 and 18, the female connector 38 includes a pair of pin receiving vertical passageways 224, 226 which intersect the alignment guide openings or guideways 240, 242. Pin members 228, 230 extending from the locking member 46 shown more particularly in FIGS. 25 through 27 are positioned through these pin receiving holes 266, 268 defined in the projecting male mating guide members 262, 264 to urge and maintain the front end portions of fluid conveying projections 246-250 on the mating face 252 of the male connector 70 into locked and sealing engagement with sockets 280-284 of the female connector 38, respectively. In addition, as shown in FIG. 16, adjacent the lower left and right hand sides of the mating face 232 of the female connector 38 are undercut notches 270, 272 which are adapted to receive lateral locking flange members 274, 276 projecting from opposed sides of the mating face 252 of the male connector 70. These notches 270, 272 further serve to polarize the mating of the male plug 70 with the female connector 38 and further assist in guiding the male connector 70 into fully mated position within the female connector 38.

Figure 21:
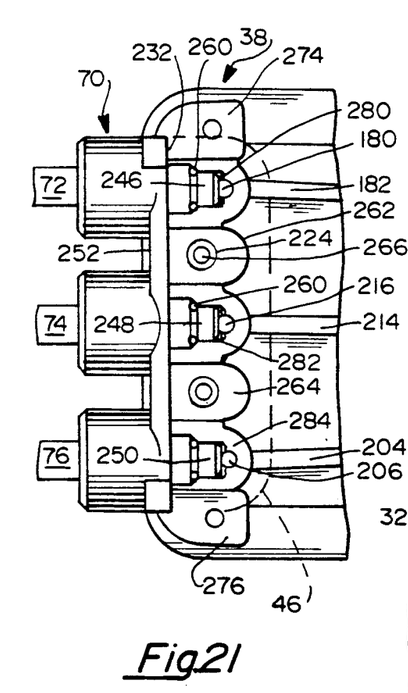
FIG. 21 is a top plan view of the male and female I/O connector halves shown in mated, sealingly engaged relationship.

Referring now to FIG. 21, the input/output connector 38 and 70 is shown in its mated, locked and sealed position with the locking bracket member 46 in place. Each of the O-ring seals 260 carried on the mating face 252 of the male member 70 are compressed radially and/or axially between the angled surfaces 258 of the male member 70 and the angled surfaces 256 socket members 280-284 to provide a fluid tight seal for the fluid conducting projections 246-250. Each of the guiding projections 262, 264 have been received within the guiding apertures 240, 242 defined in the mating face 232 until the pin hole openings 266, 268 in the guiding projections 262, 264 are disposed in registration with the pin receiving openings 224, 226 of the female connector 38. This ensures that the male connector 70 has been urged forwardly into a mated and sealed engagement within the female connector 38 so that the O-ring seals are axially and/or radially compressed. The locking bracket 46 may be affixed into position by inserting the pins 228, 230 into the aligned openings 224, 266 and 226, 268 respectively. Locking member 46 may be secured by passing threaded screws 48 through the lateral mounting flanges 274, 276 of the male connector 70 to secure it in locked and mated condition to flanges 220, 222 of the female connector 38 as shown.

Referring now to FIG. 19, the automatic shutoff assembly 50 comprises a housing 300 molded into the upper surface 82 of the upper body half 86. Valve housing 300 is adapted to receive automatic shutoff valving elements as shown. The valving elements include a positioning ring 302, a movable piston 304 secured between upper and lower diaphragm members 306, 308, and sealingly engaged in to the valve housing structure by a valve cap structure 310. In assembled condition, as shown in FIG. 19, a lower valve chamber 312 is defined adjacent the valve seat 314 and an upper valve chamber 316 is defined within the secured cap member 310. The area of the upper piston surface 318 is considerably larger than the area of the lower piston surface 320.

In accordance with this arrangement, incoming sediment prefiltered tap water at line pressure passes upwardly through upflow opening 190 into the lower valve chamber 312, thereby exerting an upward pressure on the lower piston surface 320. This causes the movable piston 304 to be lifted off of valve seat 314, permitting the pre-filtered water to flow into the valve outlet 192 for transmission along passage 194 to the granular activated carbon inlet aperture 196. The upper valve chamber 316 is connected by means of a vertical channel 322 to the R.O. purified water passage 204 and channel 206 which are in turn connected to the pure water line 76 to the storage tank, such as tank 3 in FIG. 1.

As purified R.O. water fills the storage tank 3 to capacity, pressure in the pure water line 76, 206, 204 and 322 increases causing pressure to develop or increase in the upper valving chamber 316. Pressure in the upper valving chamber 316 exerts a downward pushing force against upper piston surface 318 causing downward movement of the piston 304 against the valve seat 314 to shut off incoming water flow from opening 190 when the tank 3 is substantially filled. By adjusting the relative area of the upper piston surface 318 to the lower piston surface 320, the valve 50 can be adjusted to shut off incoming water flow when a relatively moderate amount of pressure increase is experienced in the storage tank 3 and pure water line 74. For example, valve 50 may be actuated to its closed or shutoff position at approximately $\frac{2}{3}$ line pressure or less. After being moved to its closed, shutoff position, the relative area of lower piston surface is reduced even further to that circumscribed by valve seat 314. In order to reopen the automatic shut-off (ASO) valve assembly 50, the storage tank pressure is permitted to drip $\frac{1}{2}$ of line pressure or less, preferably $\frac{1}{3}$ of line pressure or less, before the incoming tap water exerts sufficient upward pressure on the piston to reopen the ASO. Thereafter, the R.O. filter section may run continuously for a time until storage tank pressure again rises sufficiently to shut off the ASO valve assembly. Improved R.O. product water quality is expected from this continuous cycling.

Referring now to FIG. 20, in some embodiments the filter section 20 in accordance with the present invention may not require there to be an automatic shutoff valve provided. In accordance with these arrangements, the shutoff valve housing 300 may be effectively closed off by means of a conversion plug member 324 which cooperates with the valve housing cap 310 to permit incoming fluid to flow through the lower valve chamber 312 and out through the exit opening 192 without any other valve activity. The ASO valve housing 300 may also be used to receive paddle wheel flow meters, reed switches, LED and alarm assemblies to indicate total flow and alert when a changeover and/or service of treatment modules should be performed.

The ability to hot plate fusion bond thermoplastics enables the fluid flow control device to be molded from independent complimentary housing halves. This provides improved flexibility in channel and passageway design by injection molding of the housing parts, rather than trying to core out or machine similar passageways in a solid molded block of thermoplastic resin. Moreover, the ability to mold the housing parts enables the various other structures to be incorporated into the mold such as lo the valve 50 and the tube connector 36 for the R.O. filter tubing 32. These additional features may be molded in without having to provide separate leakable structures for connecting them to the housing of the fluid flow control device. As is shown by the rectangular areas in FIGS. 9 and 13, optional pins and holes, dams or flow gates 340 are preferably designed into molds for upper and lower housing halves 86 and 88 to either open up or close off portions of fluid flow passages in the device 22. The dams 340 are also added or removed easily by means of quick change pins and plugs designed into the mold tooling. In this manner, fluid flow device 22 maybe programmed to provide appropriate fluid flow for other filter sequence combinations, by making minor mold changes built into the molds.

In accordance with this invention, the fluid flow control device permits the filter section of an R.O. system to have pop-in/pop-out easy access feature.

Although the present invention has been described with reference to a modular filter subassembly including a sediment pre-filter 64, a granulated activated carbon filter 66 and a reverse osmosis membrane filter 68, other filter or water treatment cartridges 62 could be affixed to the fluid flow control device 22 by means of a socketing portions 50, as desired. The socket number may be increased or decreased as desired to meet the requirements for additional treatment modules and vessels required for any end use application, while retaining the advantages provided by the present fluid flow control device. Additional fluid flow circuits may be added as additional ports in the I/O connector section in accordance with the principles of the invention. For example, it may be desired to store purified water in a storage tank and to pass the water from the tank through a GAC filter to remove any residual tank taste before the purified water leaves the dispenser faucet. In accordance with this arrangement, the post storage GAC filter may be added as a fourth socket module assembly and circuit path defined in the fluid flow control device. In this case one or more additional I/O ports may be required to be added to I/O connector including a return pure water line in from tank and a new post filter line out to dispenser faucet.

Regardless of the number of sockets, ports, channels and passageways that may be needed, they may be readily accommodated in multiple duty molds for the housing halves to provide for a variety of programmable flow possibilities. As indicated in the drawings, quick change tooling in the mold can convert the mold from one arrangement to another. Only one basic mold is therefore needed to produce a variety of fluid flow control devices for use with a number of filter module arrangements.

The fluid flow control device dramatically cuts down on the number of potential leakage problems caused by connections of tubing. More particularly, a comparison of the FIG. 2 prior art assembly with the assembly of this invention shown in FIG. 3, indicates that the prior art system 1 included 16 separate polytube connectors susceptible of leaking in the pressure environment, whereas the FIG. 3 device, in accordance with the present invention, has a total number of five possible leaking connections to tubing, which may be reduced even further for filter subassembly which do not include a TFC R.O. filter 68. In this case, the double ended tubing connector 32 could be avoided, thereby reducing the total potential leakage sites to three or less.

Although the present invention has been described with reference to certain preferred embodiments, modifications or changes may be made therein by those skilled in this art. For example, other filters and filter modules may be employed in substitution for those disclosed. Ceramic filters or other specialty filters may be used. Lead removal or nitrate removal filter modules may be employed. Various other water treatment modules might be used such as iodinated resin disinfectant modules, as well as calcium or vitamin nutrient additive modules. Moreover, instead of providing a three socket device adapted to matingly and sealingly receive three filter modules, a device having any number of module-receiving sockets provided in an extended length fluid flow control device may be molded and prepared in accordance with the teachings of the present invention. All such obvious modifications or changes may be made herein by those skilled in this art without departing from the scope and spirit of this invention as defined by the appended claims.

We claim:

1. A fluid flow control device for use in a water treating system for making fluid connections between a series of water treatment modules and other system elements, said fluid flow control device comprising:
an elongate unitary thermoplastic body including a plurality of treatment module-receiving sockets for matably engaging a like plurality of treatment modules, input/output connector means defined in said body for matably engaging complimentary input/output connector means adapted to convey impure tap water from the system to said fluid flow control device and treated product water and waste water away from the fluid flow control device to provide communication with other elements of said system, a plurality of fluid flow passages being defined in said body for conveying fluids therein and to and from said sockets and said body further including channel means for conveying fluids extending between selected ones of said passages and said input/output connector means.

2. A fluid flow control device as defined in claim 1, wherein said unitary thermoplastic body comprises a pair of fusion bonded housing halves.

3. A fluid flow control device as defined in claim 2, wherein said device is capable of withstanding elevated pressures above tap water line pressure without rupturing or leaking.

4. A fluid flow control device as defined in claim 3, wherein said passages and said channels within said body are each individually capable of withstanding elevated pressures of up to about 1100 psi without rupturing or leaking.

5. A fluid flow control device as defined in claim 1, further including locking means for releasably locking the input/output means of said device and said complimentary input/output connector in sealed and mated engagement with each other.

6. A fluid flow control device as defined in claim 1, further including automatic shutoff valve means defined in said body in fluid flow communication with certain ones of said passages.

7. A fluid flow control device as defined in claim 1, wherein said thermoplastic body comprises an alloyed blend of nylon and an ABS resin.

8. A modular multi-filter subassembly for use in a water filtration purification system, said filtration-purification system including a source of impure tap water at line pressure, means for dispensing purified water from a storage tank to a point of use, means for introducing purified water into the storage tank; and means for conveying waste water to drain, said subassembly comprising: a fluid flow control device including an elongate unitary thermoplastic body having a plurality of filter module-receiving sockets defined therein at spaced apart locations along the length thereof, a plurality of discrete fluid flow passages defined in said body for making various fluid flow connections to and from each of said sockets in said device, input/output connector means defined in said body, said connector means including a plurality of channel means for connecting selected ones of said passages to said system tap water source, said introducing means and said conveying means, and a plurality of filter modules matedly and sealingly engaged in said sockets, each filter module having chemical or mechanical removal media therein, said device body further having aperture means defined in each socket for providing inflow and outflow of fluids as required for each of said filter modules, said subassembly further including means for maintaining each of said filter modules in sealed, pressure tight engagement with said sockets, and means for connecting said subassembly to the remainder of said filtration purification system.

9. A modular subassembly as defined in claim 8 including at least three sockets and three filter modules sealingly engaged therein.

10. A modular subassembly as defined in claim 9 wherein at least one of said filter modules comprises a reverse osmosis type filter module.

11. A modular subassembly as defined in claim 8 wherein said filter modules are the same or different and each filter module includes physical or chemical removal media for selectively removing certain suspended or dissolved solids from a flow of water traveling through said filter module.

12. A modular subassembly as defined in claim 11 wherein each of said filter modules are different.

13. A modular subassembly as defined in claim 12 including a sediment filter, a granular activated carbon filter and a reverse osmosis filter.

14. A modular subassembly as defined in claim 8 wherein said means for maintaining said filter modules in sealed fluid tight engagement with said sockets comprises cooperating threaded coupling means on each said socket and filter module.

15. A reverse osmosis filtration water purification system comprising:
a source of impure tap water at line pressure, a pure water storage tank, means for dispensing purified water from said storage tank to a point of use, means for introducing purified water into the storage tank, means for conveying waste water to drain, and a modular filter subassembly including a fluid flow control device and a plurality of filter modules operatively connected to said fluid flow control device, said fluid flow control device including an elongate unitary thermoplastic body having a plurality of filter-module receiving socket means defined therein for matably engaging a like plurality of filter modules, a plurality of fluid flow passages defined in said body for conveying fluids therein to and from said sockets, and means for connecting selected ones of said passages to said system tap water source, said introducing means and said conveying means, respectively, said subassembly including means for maintaining each said filter module in sealed, pressure tight engagement within said sockets, whereby a system characterized by having a minimum number of potential sites for leakage is provided.

16. A water filtration purification apparatus for use in a reverse osmosis (R.O.) system, said R.O. system including: a source of impure tap water at line pressure, means for dispensing purified water from a storage tank to a point of use, means for introducing purified water into the storage tank, and means for conveying waste water to drain, said water filtration purification apparatus comprising: a fluid flow control device including an elongate unitary thermoplastic body having spaced and opposed upper and lower major surfaces, a plurality of filter module-receiving socket means projecting downwardly from said lower surface at spaced apart locations along the length thereof, each socket means including a pair of spaced apart apertures defined therein in the lower major surface of said body, a plurality of discrete fluid flow passages defined in said body, some of said passages connecting certain ones of said socket apertures, input/output connector means disposed at one end of said body including a plurality of channel means for connecting selected ones of said passages to said system tap water source, said introducing means and said conveying means, respectively, a like plurality of filter modules matingly and sealingly engaged in said socket means and means designed for communicating with said R.O. system.

* * * * *